(12) United States Patent
Meijer et al.

(10) Patent No.: US 8,190,007 B2
(45) Date of Patent: May 29, 2012

(54) CALIBRATION CAMERA WITH SPECTRAL DEPTH

(75) Inventors: Eduard Johannes Meijer, Eindhoven (NL); Jan De Graaf, Uden (NL); Marcus Antonius Verschuuren, Tilburg (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 12/922,717

(22) PCT Filed: Mar. 13, 2009

(86) PCT No.: PCT/IB2009/051042
§ 371 (c)(1),
(2), (4) Date: Sep. 15, 2010

(87) PCT Pub. No.: WO2009/115961
PCT Pub. Date: Sep. 24, 2009

(65) Prior Publication Data
US 2011/0012515 A1 Jan. 20, 2011

(30) Foreign Application Priority Data
Mar. 18, 2008 (EP) .................................... 08102720

(51) Int. Cl.
*G03B 37/02* (2006.01)
(52) U.S. Cl. ............................................... 396/21
(58) Field of Classification Search ............. 396/21
See application file for complete search history.

(56) References Cited

U.S. PATENT DOCUMENTS

| | | | | |
|---|---|---|---|---|
| 5,212,555 | A | * | 5/1993 | Stoltz .......................... 348/203 |
| 5,867,264 | A | * | 2/1999 | Hinnrichs .................... 356/310 |
| 6,996,292 | B1 | | 2/2006 | Gentry et al. |
| 2002/0054276 | A1 | | 5/2002 | Kurematsu |

(Continued)

FOREIGN PATENT DOCUMENTS
EP 1750428 A2 2/2007
(Continued)

OTHER PUBLICATIONS

Raskar et al:"Computational Photography: Smart Optics, Modern Sensors and Future Cameras"; ACM Siggraph 2006, Publisher ACM Press, 96 page document.

(Continued)

*Primary Examiner* — Rodney Fuller
(74) *Attorney, Agent, or Firm* — Mark L. Beloborodov

(57) ABSTRACT

An imaging device (300), a lighting control system (400) including the imaging device (300), and a method for aligning with a reference image lighting of a site (220) illuminated by least one light source (240) are provided. The imaging device (300) and/or the lighting control system (400) include at least one processor (410) configured to control the imaging device (300) and the light source (240). The imaging device (300) has an array of reflectors (320) including selectable reflectors; a lens configured to receive image rays (330) for forming an image including pixels and provide the image rays (330) to the array of reflectors (320) for reflection as reflected rays (355); and a detector (310) configured to receive the reflected rays (355) and detect characteristics of each pixel of the image for form a resolved image. The processor (410) is further configured to sequentially select each reflector (350) of the array of reflectors (320) for reflecting the reflected rays (355) towards the detector (310).

13 Claims, 3 Drawing Sheets

U.S. PATENT DOCUMENTS

| | | | | |
|---|---|---|---|---|
| 2002/0105725 | A1* | 8/2002 | Sweatt et al. | 359/566 |
| 2006/0239336 | A1 | 10/2006 | Baraniuk et al. | |
| 2007/0195270 | A1 | 8/2007 | Hull et al. | |
| 2008/0046217 | A1* | 2/2008 | Polonskiy et al. | 702/179 |
| 2008/0048956 | A1* | 2/2008 | Rekieta et al. | 345/84 |

FOREIGN PATENT DOCUMENTS

| | | |
|---|---|---|
| WO | 2004114647 A2 | 12/2004 |

OTHER PUBLICATIONS

Devevec, P.: "Virtual Cinematography: Relighting Through Computation"; USC Centers for Creative Technolgies, IEEE, Aug. 2006, vol. 39, No. 8, pp. 57-65.

Nayar, S.: "Computational Cameras: Redefining the Image"; IEEE Computer Society, Aug. 2006, vol. 39, No. 8, pp. 30-38.

* cited by examiner

CALIBRATION CAMERA WITH SPECTRAL DEPTH

The present invention relates to an imaging device, such as a camera, for detecting fully resolved images of a site or environment with detailed features and additional resolutions, such as including geometrical dimensions, time and/or spectral resolution of each pixel in an image captured by the imaging device for accurate calibration and measure of the light content of the site, environment, room or space for alignment with a reference site and/or a fully resolved reference image.

Advances in cameras and photography include digital photography and cameras. Such advances are used in virtual cinematography for virtual control of illumination. Other advances include adaptively lighting a scene with a digital light projector, as described in U.S. Patent Application Publication No. US2007/0195270 to Hull, which is incorporated herein by reference in its entirety.

In addition, digital micro-mirrors devices (DMD) have been proposed for use with cameras. FIG. 1 shows a conventional DMD or array 100 of micro-mirrors 110 developed at Texas Instruments Inc. for video projection, using tiny micro-mirrors provided in a large array. Each mirror 110 is tiltable towards or away from a light source, thus selectively directing a small light beam from each mirror (pixel) to a projection screen. Tilting the mirror turns a pixel on or off. Projection systems, such as DLP™ projection televisions, use a DMD which is an optical semiconductor also referred to as a DLP™ chip or integrated circuit.

A DLP™ chip is a very sophisticated light switch and may contain a rectangular array of up to 2 million hinge-mounted microscopic mirrors, where each micro-mirror measures less than one-fifth the width of a human hair. When a DLP™ chip is coordinated with a digital video or graphic signal, a light source, and a projection lens, its mirrors reflect an all-digital image onto a screen or other surfaces, such as used in projection televisions and other projection systems, for example. The DLP™ chip and associated electronics are referred to as Digital Light Processing™ (DLP) technology.

A DLP™ chip's micromirrors are mounted on tiny hinges that enable them to tilt either toward the light source in a DLP™ projection system (pixel ON), or away from the light source (pixel OFF). This creates a light pixel or a dark pixel on the projection surface. A bit-streamed image code is provided to the semiconductor or DLP™ chip to control tilting or switching on/off of each mirror/pixel up to several thousand times per second. When a mirror 110 is switched on more frequently than off, it reflects a light gray pixel. By contract, a mirror 110 which is switched off more frequently (than switched on) reflects a darker gray pixel. In this way, the mirrors in a DLP™ projection system reflect pixels in up to 1,024 shades of gray to convert a video or graphic signal entering the DLP™ chip into a highly detailed grayscale image.

Cameras have wide applications including use in retail stores. In chain retail stores, typically it is desired to have similar illumination in all branches of the chain store, including controlling the light settings of each branch centrally, e.g., from a central office. For example, store managers typically want to be able to control winter and summer lighting settings for all their branch offices at the same time so that all branches have the same illumination. One issue related to achieving uniform illumination in all branches of a chain retail store is the diversity of, or difference in, the branch offices/stores in terms of the positions of different lighting fixtures, as well as the shape, decoration and color(s) of the rooms or retail space/site, and objects or items located in such different sites or branch offices/stores. Conventional lighting control systems do not provide satisfactory control of lighting system of multiple sites to achieve substantially similar illumination.

Accordingly, there is a need for better control of light sources or lighting systems in multiple sites to achieve desired light scenes and illumination, such as providing substantially similar or uniform illumination at the various, remotely located, sites.

One object of the present systems and methods is to overcome the disadvantages of conventional lighting control systems. According to illustrative embodiments, an imaging device, a lighting control system including the imaging device, and a method for aligning with a reference image lighting of a site illuminated by least one light source are provided. The imaging device and/or the lighting control system include at least one processor configured to control the imaging device and the light source. The imaging device has an array of reflectors including selectable reflectors; a lens configured to receive image rays for forming an image including pixels and provide the image rays to the array of reflectors for reflection as reflected rays; and a detector configured to receive the reflected rays and detect characteristics of each pixel of the image for forming a resolved image. The processor is further configured to sequentially select each reflector of the array of reflectors for reflecting the reflected rays towards the detector.

Further areas of applicability of the present systems and methods will become apparent from the detailed description provided hereinafter. It should be understood that the detailed description and specific examples, while indicating exemplary embodiments of the systems and methods, are intended for purposes of illustration only and are not intended to limit the scope of the invention.

These and other features, aspects, and advantages of the apparatus, systems and methods of the present invention will become better understood from the following description, appended claims, and accompanying drawing where:

The following description of certain exemplary embodiments is merely exemplary in nature and is in no way intended to limit the invention, its applications, or uses. In the following detailed description of embodiments of the present systems and methods, reference is made to the accompanying drawings which form a part hereof, and in which are shown by way of illustration specific embodiments in which the described systems and methods may be practiced. These embodiments are described in sufficient detail to enable those skilled in the art to practice the presently disclosed systems and methods, and it is to be understood that other embodiments may be utilized and that structural and logical changes may be made without departing from the spirit and scope of the present system.

For purposes of simplifying a description of the present system, the term "operatively coupled" and formatives thereof as utilized herein, such as "operationally coupled" and the like, refer to a connection between devices or portions thereof that enables operation in accordance with the present system. For example, an operative coupling may include one or more of a wired connection and/or a wireless connection between two or more devices that enables a one and/or two-way communication path between the devices or portions thereof.

The following detailed description is therefore not to be taken in a limiting sense, and the scope of the present system is defined only by the appended claims. The leading digit(s) of the reference numbers in the figures herein typically correspond to the figure number, with the exception that identical components which appear in multiple figures are identified by the same reference numbers. Moreover, for the purpose of clarity, detailed descriptions of well-known devices, circuits, and methods are omitted so as not to obscure the description of the present system.

Calibration per site is performed, in order to align with a reference image lighting of a site illuminated by least one light source, and achieve uniform illumination at different locations having at least one light source, which may by any type controllable light source including incandescent, fluorescent, high intensity discharge, light emitting diodes (LEDs) etc., and/or at least one object to be illuminated by the light source, such as at different branches of a chain store, or hotel lobbies of different branches of a hotel chain. For interior design and retail shop windows, hotel lobbies and food displays, for example, color consistency and rendering are one of the important parameters for achieving a consistent look-and-feel at different locations of chain establishments, such as chain stores, chain hotels or other franchises. Typically, franchise establishments want to have the same lighting experience settings in all branch stores, even though each store has different size, shape and interior.

Figure 1:
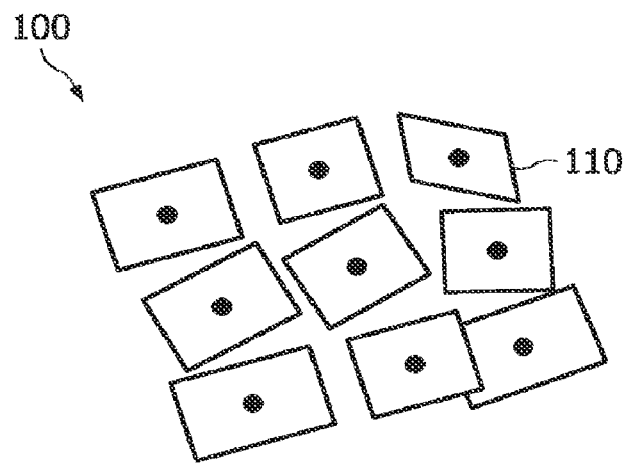
FIG. 1 shows a conventional array of micro-mirrors.
Figure 2:
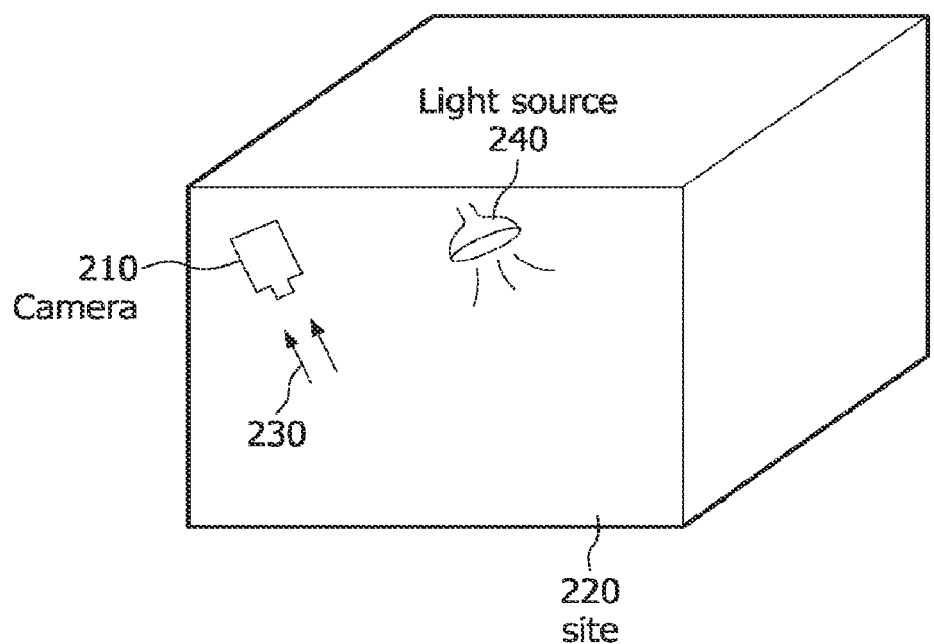
FIG. 2 shows a camera used for controlling illumination at a site according to one embodiment.

In one aspect of the present system, commissioning of all stores is performed where a 3D representation of each space is made as a function of the color or wavelength of light, as detected by a sensor such as an image detected by an imaging device such as a camera 210 shown in FIG. 2, for example, in order to achieve an accurate initial calibration at an initial or a reference site and/or at other remote sites, for example, to obtain a fully resolved reference image, where characteristics of each pixel is determined. Pixel characteristics include geometrical dimensions (x,y,z), time (t), as well as spectral resolution and spectral content, such as color, intensity, hue, saturation and the like. Other fully resolved images of other sites or locations are obtained and compared with the reference image to form a comparison result, such as performed by central or system processor or a processor associated with each imaging device or camera 210 shown in FIGS. 2, 3A and 3B. The processor (shows as reference numeral 410 in FIG. 4) is configured to adjust the light source 240 to change the resolved image until the comparison result is below a predetermined threshold.

For lighting control systems, the initial calibration is performed to provide an accurate measure of the light content of an entire room or space illuminated by a lighting system under the control of the lighting control systems. Calibration may be achieved by calibrating a local branch office or local site in terms of lighting content and subsequent monitoring of that lighting content. The light source(s) and object(s) to be illuminated may be similar or different at the various different site locations where, for example, the number, type and/or positions of the light source(s) and/or object(s) may be similar or different at the various different site locations. It is desired to provide light setting(s) or illumination that is substantially similar at the different site locations thus creating an ambience or experience, e.g., a look-and-feel, which is similar at the different site locations.

To achieve calibration and a uniform look-and-feel, an imaging device(s) and/or sensors such as one or more cameras 210 are used to detect an image(s) at the local site or branch 220 shown in FIG. 2. Further, the spectrum is detected for each pixel of the image where geometrical dimensions (x,y,z) and time (t) are recorded, as well as spectral resolution, as a fifth dimension. This allows a full spectral determination of the light distribution in the subject of the image to control illumination based on location of light sources 240 and/or objects/space being illuminates, time of day, as well as color and/or intensity of the illumination or of the pixels of the image(s) of the site captured by the camera 210.

An image of a site having a desired illumination and detected by the camera 210 will have its spectrum fully determined. Such an image may be used as a reference image for calibration and control of illumination/light sources at other different remote locations. Information related to the spectrum of each pixel in the reference image and a subject image of a remote site may be used, e.g., compared, in order to control illumination/light sources at the remote site to achieve illumination (at the remote site which is) similar to the illumination in the reference image of an initial or reference site, for example.

Images detected at the remote site by the camera 210 are fully resolved and their spectrum compared with the spectrum of the reference image. Illumination at the remote site is changed until the comparison results are acceptable, such as being below a predetermined threshold indicating that the spectrum of the image at the remote site is substantially similar to the spectrum of the reference image.

Thus, spectral information of each pixel in an image(s) are used in light designing, scene rendering and full spectral reconstruction of the image for use in controlling light sources at various locations and achieve the desired illumination, such as by comparing spectral information of images at the subject location to be illuminated with spectral information of the reference image.

For the light designer, lighting at each site may be calibrated using Three-Dimensional (3D) scanning of both the space/object (to be illuminated) and the light or light sources (used for illuminating the space/object). Subsequent monitoring using a set of local sensors, e.g., cameras, may be used to keep the light settings to an initial lighting target, e.g., set and calibrated by the lighting designer.

The present systems and methods are configured to allow the lighting designer to reconstruct spectrally resolved images of the different sites, locations or rooms that are to be calibrated for achieving an illumination or lighting scenario similar to each other, or similar to a reference illumination, site or image. Such similar illumination or lighting scenarios (at different sites) are achieved using an imaging technique with spectral depth per pixel including lighting calibration for lighting control systems.

FIG. 2 shows a site 220, such as a room, where illumination is to be controlled. At the site 220, at least one camera 210 is provided that receives light rays 230 to form an image of the site 220 and to measure the spectral depth of the image per pixel of that image and fully determine the spectral content of the light distribution in the site 220 or in the image of the site 220. This allows a lighting designer to measure the spectral content of the room or site 220 as a function of objects, light sources 240 and the positions of objects and light sources in that room, which is used for an accurate calibration of the room lighting system, as well as for aligning the light settings of the one or more light sources at different branch offices to achieve a substantially uniform light distribution throughout the different branch offices. It may be desirable to have cameras at different locations that are substantially located or directed to view/detect substantially similar images, where a first camera in a first store and a second camera in a second store are both directed or pointed toward respective walls of rooms for comparison of images and alignment of lighting at both stores. Other cameras used for image comparison and light control may be directed towards windows of the stores, for example.

Figure 3A:
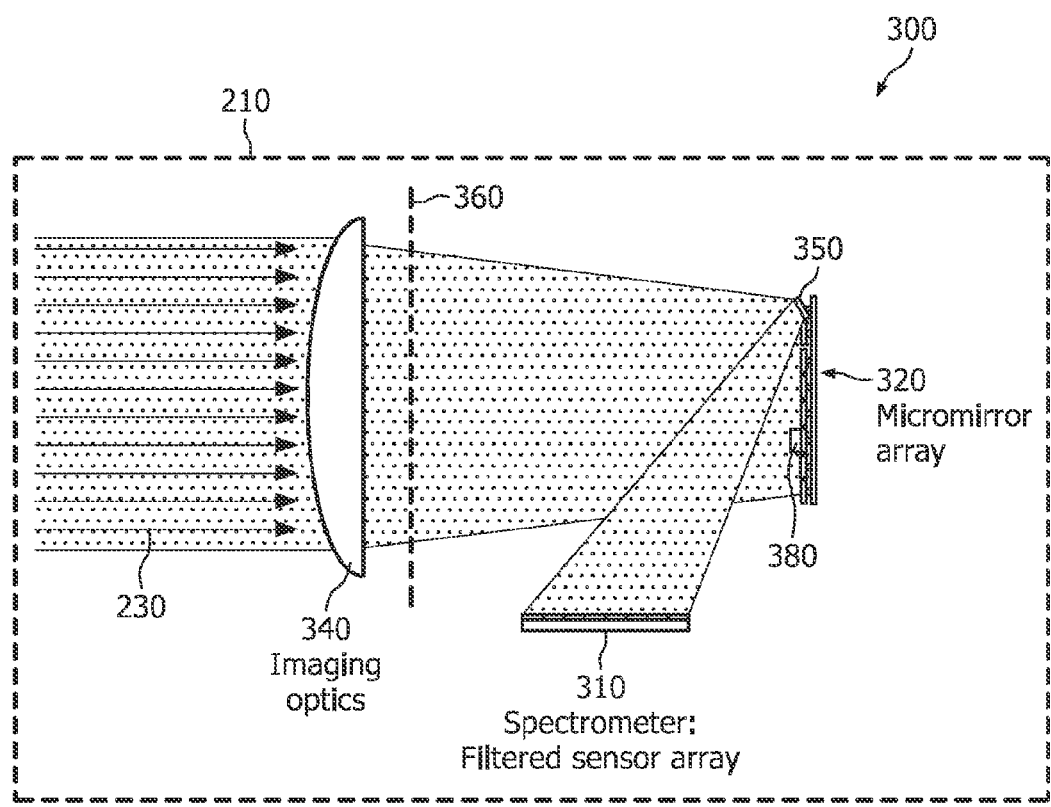
FIGS. 3A-3B show the camera of FIG. 2 in greater detail having spectral resolution per image-pixel according to one embodiment.
Figure 3B:
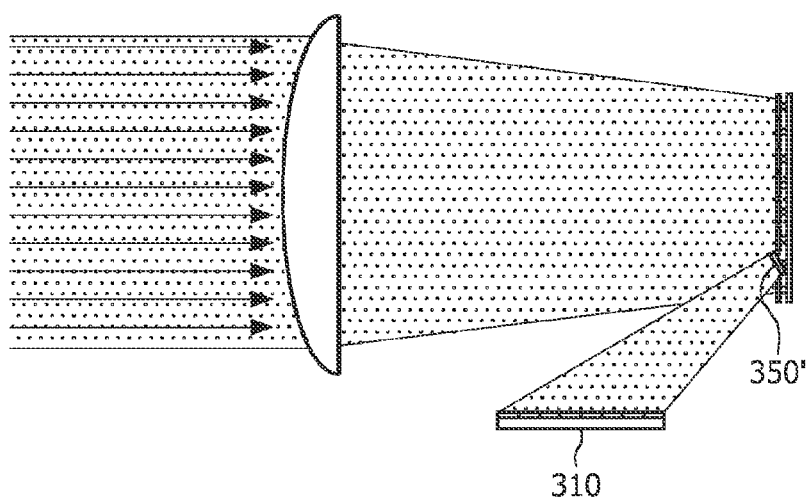

This is achieved by using the camera 210 that includes an imaging array having single pixel selectability for mapping the light that hits each pixel individually onto a spectral detector 310 shown in FIGS. 3A-3B. Such a spectrally resolved image sensor, that fully measures spectral content and resolves each pixel in an image, allows accurate calibration of rooms, shops or any space, thus allowing alignment of different branch offices in terms of lighting content.

FIG. 3A shows one embodiment of a system 300 that includes the camera 210 of FIG. 2, used for control of light sources (through a processor or controller 410 shown in FIG. 4) and alignment of lighting content at different locations using one or more spectral detectors 310, such as a grating-based spectrometer or a narrow-band filter-based spectrometer. As shown in FIG. 3A, the spectrometer 310 is combined with a digital micro-mirror array 320, such as an array developed by Texas Instruments for light projection. However, instead of using the array 320 to project light, the digital micro-mirror array 320 is used in reverse, namely to receive light and direct it to the spectrometer 310 on a pixel-per-pixel basis.

As shown in FIG. 3A, the digital micro-mirror array 320 receives image or light rays 330 through at least one lens 340 or any appropriate imaging optics. The image or light rays 330 may be coming from the site 220 to be calibrated or controlled, and captured by the camera 210 or the system 300 (such as the light rays 230 shown in FIG. 2). Accordingly, an image of the site 220, of a scene or of any subject, is imaged onto the micromirror array 320 with the imaging optics 340. The light hitting each mirror 350 (i.e., each pixel) of the array 320 is directed towards the input of the spectrometer 310, or away from it, e.g., under the control of a processor 410 shown in FIG. 4, thus allowing selection of which pixel spectrum to detect. The micro-mirrors 350 are individually controllable, such as being sequentially switched to direct the light impinging on them towards the spectrometer 310, under the control of the processor 410, thus allowing the sequential detection of the spectrum for each pixel.

FIG. 3A shows a mirror 350 which is selected to direct light from the imaging optics 340 toward towards the spectrometer 310. By sequentially switching the micro-mirrors 350 of the micro-mirror array 320, each mirror sequentially directs the light received from the imaging optics 340 toward towards the spectrometer 310. Thus, the light that is imaged on each mirror-pixel 350 is mapped and redirected to fall on the spectrally sensitive detector array 310, thus allowing the spectrum of the image (of the site 220) to be measured sequentially for each micro-mirror-pixel 350.

In FIG. 3A, the top mirror 350 of the camera 300 (with spectral resolution per image-pixel) is deflected towards the spectral detector 310 and so the light reflecting from that mirror-pixel 350 is measured. In FIG. 3B, the light reflected from another micromirror 350' is measured by the spectral detector 310.

Alternatively, or in addition to tiltable mirrors, the mirrors 350 may be fixed and are positioned such that the light hitting them is reflected onto the spectrometer sensor 310. A tunable aperture may be used be select individual fixed mirrors. The tunable aperture is shown as dashed lines 360 and may be, for example, a LC (Liquid Crystal) cell. However, any other electro-optical light modulators and/or light selector may also be used as readily appreciated by those skilled in the art, such as electrophoretic aperture or cell using an electrophoretic solution.

From FIGS. 3A-3B, it can be seen that light reflected from individual (mirror) pixels 350, 350' can be directed towards the spectral detector 310. The spectral detector 310 has an angular dependence if it is based on an array of photosensors covered with an array of interference filters, with different responses. It should be noted that a limited acceptance angle of the DMD device will limit the angular range of light reaching the interference filter, thus increasing the accuracy of the filter due to lower angle dependence.

It should be noted that, depending on which mirror 350 of the array 320 is selected for reflecting light towards the spectral detector 310, the light distribution is different, but it is known, such as based on the known locations of the mirrors 350 and spectral detector 310, knowledge of which mirror 350 is being switched, the angle of the switched mirror 350, its location in the mirror array 320, and where the reflected light from the switched mirror 350 is incident on the spectral detector 310. Thus, the light angle distribution of the light collected by the imaging optics 340, and subsequently deflected by the individual micro-mirrors 350, is known and readily calculated. Therefore, the angular dependence of the interference filters of the spectral detector 310 may be easily corrected for different mirrors, if necessary.

Instead of using an interference filter as the spectral detector 310, a grating-based spectrometer may be used as the spectral detector 310. The angular dependencies of such a spectrometer are solved in exactly the same way the case of an interference filter, as is well known by those skilled in the art related to interference filter, grating-based spectrometer and/or position/angular determination. The angle of incidence is readily determined by those skilled in the art. For example, from the position of the tilted mirror with respect to the grating, the angle under which light enters the spectrometer is calculated. The angular dependence of a grating based spectrometer is then described by $d(\sin \theta_{in} + \sin \theta_{refracted}) = m\lambda$, where d is the grating pitch, $\theta_{in}$ is the angle under which the light is incident on the grating, $\theta_{refracted}$ is the angle under which the light is refracted, m is an integer denoting the order of refraction, and $\lambda$ is the wavelength. The image itself, corresponding with the spectra on pixel level, may be detected by an additional small imaging sensor such as a CCD or a photodiode array, such as is frequently used in a webcam or a digital camera.

It should be noted that instead of the mirrors in the DLP™ array 320, reflective gratings may be provided. That is, in FIGS. 3A and 3B, reference numerals 350, 350' may denote either mirrors or reflective gratings, similar to a monochromator, where the reflective gratings 350, 350' may be tilted towards and/or away from the sensor array 310. Of course, in this embodiment, reference numeral 320 refers to an array of reflective gratings 350, 350' (instead of a DLP™ array). Thus, the tiltable mirrors of the DLP™ may be replaced with tiltable reflective gratings. Then each pixel 350 of the array 320 has a reflective grating that may be tilted towards or away from the sensor array 310. By controlling the angle of the tilt, such as via a processor (e.g., shown as 410 in FIG. 4)) that executes instructions stored on a memory (420 in FIG. 4), which may be any computer readable medium, one may choose what refracted wavelength of light is hitting what part of the sensor array 310. In this embodiment where the tiltable mirrors are replaced with tiltable reflective gratings, different orders or wavelengths may be selected that are reflected towards the sensor 310 by tuning the angle of the reflective gratings. Thus, by tilting the reflective gratings, a desired wavelength may by selected and reflected towards the sensor array 310. Thus for each pixel, the spectral information may be retrieved.

In an additional embodiment, instead of or in addition to a spectrometer, a MEMS (Micro-Electro-Mechanical System) tunable interferometer may be used, where various elements (e.g., mechanical devices, sensors, actuators, and electronics) are integrated on a common silicon or other semiconductor substrate, for example. Illustratively, a MEMS tunable interferometer may include a tunable optical cavity, e.g., two mirrors, one mirror on a transparent substrate and the other mirror is a free hanging structure attached with springs to the substrate. By applying an electrostatic force, the mirrors may be moved closer together, effectively changing the optical path length of the air cavity between the mirrors and thus changing the optical response.

Additionally or alternately, an interference stack 380 may be added to the surface of the micro-mirrors 350, such that the UV-part of the spectrum and or the infrared part of the spectrum are also deflected towards, and detected by, the spectral detector 350. For clarity, only one of the mirrors 350 in FIG. 3B is shown to have the interference stack(s) 380. However, it should be understood that all or any portion of the mirrors 350 include the interference stack(s) 380. Further, depending on the intensity of the light hitting each pixel or micro-mirror 350, a longer dwell time of the micro-mirror 350 may be used to allow a higher signal to noise ratio as compared to a pixel that receives a high light intensity.

Figure 4:
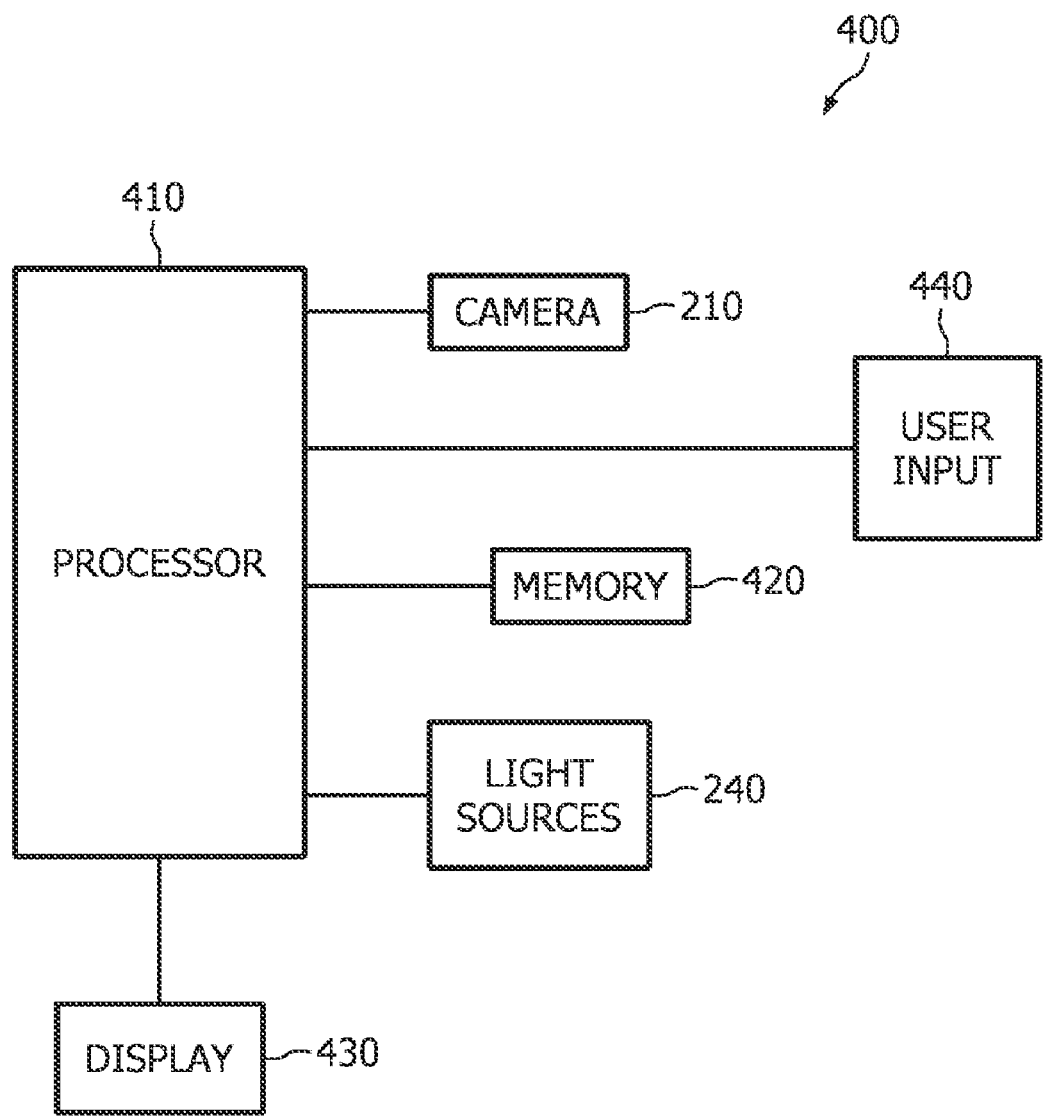
FIG. 4 shows block diagram of a control system according to another embodiment.

FIG. 4 shows system block diagram 400 according to one embodiment that includes a processor or controller 410 which may be operationally coupled to a memory 420, a display 430, and a user input device 440. The processor 410 and memory 465 may be any type of device for processing and/or storing application data as well as other data related to the described operation. The application data and other data are received by the processor 410 for configuring the processor 410 to perform operation acts in accordance with the present system. The operation acts may include controlling the camera to obtain desired images of sites, controlling light sources to achieve desired illumination, such as by comparing site images with a reference image and adjusting the illumination image until the comparison result is below a desired threshold. The processor 410, memory 420, display 430, and a user input device 440 may be part of a central controller or included in each camera 210, or further processors, memory and/or other devices as needed may also be provided such as included in the camera or provided in local controllers at the various locations. Clearly the processor 410, the memory 420, display 430 and/or user input device 440 may all or partly be a portion of control device or other device for operation in accordance with the present system.

The methods of the present system are particularly suited to be carried out by a computer software program, such program containing modules corresponding to one or more of the individual steps or acts described and/or envisioned by the present system. Such program may of course be embodied in a computer-readable medium, such as an integrated chip, a peripheral device or memory, such as the memory 420 or other memory coupled to the processor 410.

The memory 420 and other memories configure the processor 410 to implement the methods, operational acts, and functions disclosed herein. The memories may be distributed, for example between the various nodes and the processor 410, where additional processors may be provided, may also be distributed or may be singular. The memories may be implemented as electrical, magnetic or optical memory, or any combination of these or other types of storage devices. Moreover, the term "memory" should be construed broadly enough to encompass any information able to be read from or written to an address in an addressable space accessible by the processor 410. With this definition, information accessible through the wired connection (e.g., wired connection to other devices, such a server and/or memory on a network such as the Internet) is still within the memory 420, for instance, because the processor 410 may retrieve the information from one or more of the operable connections (wired or wireless) in accordance with the present system.

Of course, it is to be appreciated that any one of the above embodiments or processes may be combined with one or more other embodiments and/or processes or be separated and/or performed amongst separate devices or device portions in accordance with the present system.

Further, as it would be apparent to one skilled in the art of communication in view of the present description, various elements may be included in the system or network components for communication, such as transmitters, receivers, or transceivers, antennas, modulators, demodulators, converters, duplexers, filters, multiplexers etc. The communication or links among the various system components may be by any means, such as wired or wireless for example. The system elements may be separate or integrated together, such as with the processor. As is well-known, the processor executes instruction stored in the memory, for example, which may also store other data, such as predetermined or programmable settings related to system control.

Various modifications may also be provided as recognized by those skilled in the art in view of the description herein. The operation acts of the present methods are particularly suited to be carried out by a computer software program. The application data and other data are received by the controller or processor for configuring it to perform operation acts in accordance with the present systems and methods. Such software, application data as well as other data may of course be embodied in a computer-readable medium, such as an integrated chip, a peripheral device or memory, such as the memory or other memory coupled to the processor of the controller.

The computer-readable medium and/or memory may be any recordable medium (e.g., RAM, ROM, removable memory, CD-ROM, hard drives, DVD, floppy disks or memory cards) or may be a transmission medium (e.g., a network comprising fiber-optics, the world-wide web, cables, and/or a wireless channel using, for example, time-division multiple access, code-division multiple access, or other wireless communication systems). Any medium known or developed that can store information suitable for use with a computer system may be used as the computer-readable medium and/or memory.

Additional memories may also be used. The computer-readable medium, the memory, and/or any other memories may be long-term, short-term, or a combination of long-and-short term memories. These memories configure the processor/controller to implement the methods, operational acts, and functions disclosed herein. The memories may be distributed or local and the processor, where additional processors may be provided, may be distributed or singular. The memories may be implemented as electrical, magnetic or optical memory, or any combination of these or other types of storage devices. Moreover, the term "memory" should be construed broadly enough to encompass any information able to be read from or written to an address in the addressable space accessed by a processor. With this definition, information on a network, such as the Internet, is still within memory, for instance, because the processor may retrieve the information from the network.

The controllers/processors and the memories may be any type. The processor may be capable of performing the various described operations and executing instructions stored in the memory. The processor may be an application-specific or general-use integrated circuit(s). Further, the processor may be a dedicated processor for performing in accordance with the present system or may be a general-purpose processor wherein only one of many functions operates for performing in accordance with the present system. The processor may operate utilizing a program portion, multiple program segments, or may be a hardware device utilizing a dedicated or multi-purpose integrated circuit. Further variations of the present system would readily occur to a person of ordinary skill in the art and are encompassed by the following claims.

Finally, the above-discussion is intended to be merely illustrative of the present system and should not be construed as limiting the appended claims to any particular embodiment or group of embodiments. Thus, while the present system has been described in particular detail with reference to specific exemplary embodiments thereof, it should also be appreciated that numerous modifications and alternative embodiments may be devised by those having ordinary skill in the art without departing from the broader and intended spirit and scope of the present system as set forth in the claims that follow. The specification and drawings are accordingly to be regarded in an illustrative manner and are not intended to limit the scope of the appended claims.

In interpreting the appended claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same or different item or hardware or software implemented structure or function;

e) any of the disclosed elements may be comprised of hardware portions (e.g., including discrete and integrated electronic circuitry), software portions (e.g., computer programming), and any combination thereof;

f) hardware portions may be comprised of one or both of analog and digital portions;

g) any of the disclosed devices or portions thereof may be combined together or separated into further portions unless specifically stated otherwise; and h) no specific sequence of acts or steps is intended to be required unless specifically indicated.

The invention claimed is:

1. An imaging device comprising:
an array of reflectors including selectable reflectors;
a lens configured to receive image rays for forming an image including pixels and provide the image rays to the array of reflectors for reflection as reflected rays;
a detector configured to receive the reflected rays and detect characteristics of each pixel of the image to form a resolved image; and
a processor configured to
sequentially select each reflector of the array of reflectors for reflecting the reflected rays towards the detector,
compare the resolved image with a reference image to form a comparison result, and
adjust at least one light source to change the resolved image until the comparison result is below a threshold.

2. The imaging device of claim 1, wherein each of the selectable reflectors is associated with a pixel of an image associated with the image rays.

3. The imaging device of claim 1, wherein the detector includes at least one of a grating-based spectrometer and a narrow-band filter-based spectrometer.

4. The imaging device of claim 1, wherein the selectable reflectors include tiltable reflectors and the processor is configured to selectably tilt the tiltable reflectors.

5. The imaging device of claim 1, wherein the processor is configured to sequentially control a tunable aperture to allow a portion of the image rays to reach substantially only a desired reflector of the selectable reflectors.

6. The imaging device of claim 5, wherein the tunable aperture includes a cell of at least one of a liquid crystal material and electrophoretic material.

7. The imaging device of claim 5, wherein the selectable reflectors include fixed tilted reflectors.

8. The imaging device of claim 1, wherein the selectable reflectors include at least one of mirrors and reflective gratings.

9. A lighting control system comprising:
at least one light source;
at least one imaging device; and
a processor configured to control the at least one imaging device and the least one light source;
wherein the imaging device comprises:
an array of reflectors including selectable reflectors;
a lens configured to receive image rays for forming an image including pixels and provide the image rays to the array of reflectors for reflection as reflected rays; and
a detector configured to receive the reflected rays and detect characteristics of each pixel of the image to form a resolved image;
the processor being further configured to sequentially control a tunable aperture and each reflector of the array of reflectors for reflecting the reflected rays towards the detector and for allowing a portion of the image rays to reach substantially only a desired reflector of the selectable reflectors.

10. A method of controlling lighting of a site illuminated by least one light source, the method comprising the acts of:
forming an image of the site by at least one imaging device that receives image rays;
providing the image rays to an array of selectable reflectors for reflection as reflected rays; and
sequentially selecting each selectable reflector of the array of reflectors for reflecting the reflected rays towards a detector;
detecting characteristics of each pixel of the image to form a resolved image; and
comparing the resolved image with a reference image to form a comparison result and adjust at least one light source to change the resolved image until the comparison result is below a threshold.

11. An imaging device comprising:
an array of reflectors, including selectable reflectors;
a tunable aperture;
a lens configured to receive image rays for forming an image including pixels and provide the image rays to the array of reflectors for reflection as reflected rays;
a detector configured to receive the reflected rays and detect characteristics of each pixel of the image to form a resolved image; and
a processor configured to sequentially select each reflector of the array of reflectors for reflecting the reflected rays towards the detector and to sequentially control the tunable aperture to allow a portion of the image rays to reach substantially only a desired reflector of the selectable reflectors.

12. The imaging device of claim 11, wherein the tunable aperture includes a cell of at least one of a liquid crystal material and electrophoretic material.

13. The imaging device of claim 11, wherein the selectable reflectors include fixed tilted reflectors.

* * * * *